US011138675B1

(12) United States Patent
Jonkers et al.

(10) Patent No.: US 11,138,675 B1
(45) Date of Patent: Oct. 5, 2021

(54) SYSTEMS, METHODS AND APPARATUS FOR ATTACHING ELECTRONIC DOCUMENTS TO AN ELECTRONIC TAX RETURN

(71) Applicant: INTUIT INC., Mountain View, CA (US)

(72) Inventors: Matheus W. Jonkers, San Diego, CA (US); James Dailey, Driggs, ID (US); Steven Keith Palmer, Escondido, CA (US)

(73) Assignee: INTUIT INC., Mountain View, CA (US)

( * ) Notice: Subject to any disclaimer, the term of this patent is extended or adjusted under 35 U.S.C. 154(b) by 226 days.

(21) Appl. No.: 15/279,227

(22) Filed: Sep. 28, 2016

(51) Int. Cl.
*G06Q 40/00* (2012.01)
*G06F 3/0482* (2013.01)
*G06F 40/174* (2020.01)

(52) U.S. Cl.
CPC ......... *G06Q 40/123* (2013.12); *G06F 3/0482* (2013.01); *G06F 40/174* (2020.01)

(58) Field of Classification Search
None
See application file for complete search history.

(56) References Cited

U.S. PATENT DOCUMENTS

| | | | |
|---|---|---|---|
| 7,234,103 B1 * | 6/2007 | Regan | G06Q 10/00 705/19 |
| 7,603,301 B1 * | 10/2009 | Regan | G06Q 10/10 705/30 |
| 7,912,767 B1 * | 3/2011 | Cheatham | G06Q 40/123 705/31 |
| 8,108,258 B1 * | 1/2012 | Slattery | G06Q 20/207 705/19 |
| 8,156,018 B1 * | 4/2012 | Quinn | G06F 17/2264 705/19 |
| 8,635,127 B1 * | 1/2014 | Shaw | G06Q 40/123 705/31 |

(Continued)

OTHER PUBLICATIONS

LPL Financial Turbotax® 2015 User Guide. URL: https://lplfinancial.lpl.com/content/dam/lpl-www/documents/turbotax-user-manual-final.pdf. (Based on other cited NPL references, release date of the software product was Jan. 19, 2016 at the latest). (Downloaded on Jul. 7, 2018). (Year: 2016).*

(Continued)

*Primary Examiner* — Ayal I. Sharon
(74) *Attorney, Agent, or Firm* — DLA Piper LLP (US)

(57) ABSTRACT

Systems, methods and articles of manufacture for preparing an electronic tax return in which a supporting document is associated with a specific form field of the tax return and attached to the tax return. The system displays a tax data input screen for a user to input tax data for a current form field of the tax return being worked on. The system determines that a supporting document is required for the current form field and displays an attach document command. When a user selects the command, the system displays a file selection function. The system receives a selection of a document file selected using the file selection function and automatically associates the selected document file with the current form field and uses metadata related to the form field to assign a document description to the selected document file.

30 Claims, 12 Drawing Sheets

(56) References Cited

U.S. PATENT DOCUMENTS

| | | | |
|---|---|---|---|
| 8,654,397 B1* | 2/2014 | Bhatt | G06F 17/217 358/1.13 |
| 8,788,412 B1* | 7/2014 | Hamm | G06F 17/30091 705/39 |
| 9,025,213 B1* | 5/2015 | Irons | G06Q 10/10 358/403 |
| 9,317,484 B1* | 4/2016 | Ho | G06F 17/2725 |
| 9,760,953 B1* | 9/2017 | Wang | G06Q 40/123 |
| 9,916,628 B1* | 3/2018 | Wang | G06Q 40/123 |
| 9,990,678 B1* | 6/2018 | Cabrera | G06Q 40/123 |
| 10,013,721 B1* | 7/2018 | Laaser | G06Q 40/123 |
| 10,157,426 B1* | 12/2018 | Wang | G06F 16/248 |
| 10,255,641 B1* | 4/2019 | Goldman | G06Q 40/123 |
| 10,387,969 B1* | 8/2019 | Wang | G06Q 40/123 |
| 2002/0059265 A1* | 5/2002 | Valorose, III | G06F 17/211 |
| 2002/0152234 A1* | 10/2002 | Estrada | G06F 40/174 715/201 |
| 2003/0101114 A1* | 5/2003 | Delapass | G06Q 10/0637 705/31 |
| 2004/0205644 A1* | 10/2004 | Shaughnessy | G06Q 10/10 715/255 |
| 2005/0050065 A1* | 3/2005 | Wilson | G06F 17/30011 |
| 2005/0150944 A1* | 7/2005 | Melick | G06K 7/10544 235/375 |
| 2007/0145138 A1* | 6/2007 | Snyder | G06F 16/93 235/462.01 |
| 2008/0005024 A1* | 1/2008 | Kirkwood | G06Q 10/00 705/50 |
| 2008/0017722 A1* | 1/2008 | Snyder | G06Q 10/00 235/494 |
| 2008/0147494 A1* | 6/2008 | Larson | G06Q 30/0234 705/14.34 |
| 2008/0154873 A1* | 6/2008 | Redlich | G06F 16/951 |
| 2008/0177601 A1* | 7/2008 | Strnad | G06Q 40/02 705/4 |
| 2008/0189197 A1* | 8/2008 | Allanson | G06Q 40/02 705/31 |
| 2009/0150169 A1* | 6/2009 | Kirkwood | G06Q 10/00 705/342 |
| 2010/0082384 A1* | 4/2010 | Bohrer | G06Q 30/02 705/7.29 |
| 2010/0106551 A1* | 4/2010 | Koskimies | G06Q 10/10 156/1 |
| 2010/0107164 A1* | 4/2010 | Koskimies | G06Q 10/10 718/100 |
| 2010/0107165 A1* | 4/2010 | Koskimies | G06Q 10/06 718/100 |
| 2010/0161460 A1* | 6/2010 | Vroom | G06Q 40/123 705/31 |
| 2011/0205576 A1* | 8/2011 | Halron | G06F 16/93 358/1.15 |
| 2012/0027246 A1* | 2/2012 | Tifford | G06K 9/033 382/100 |
| 2012/0036053 A1* | 2/2012 | Miller | G06Q 40/02 705/31 |
| 2012/0084185 A1* | 4/2012 | Ciaramitaro | G06Q 40/123 705/31 |
| 2012/0215670 A1* | 8/2012 | Pinkerman | G06Q 10/103 705/31 |
| 2012/0272221 A1* | 10/2012 | Pessoa | G06F 9/4492 717/127 |
| 2013/0294694 A1* | 11/2013 | Zhang | G06K 9/2081 382/182 |
| 2013/0304629 A1* | 11/2013 | Attaway | G06Q 40/025 705/38 |
| 2014/0180883 A1* | 6/2014 | Regan | G06Q 40/123 705/31 |
| 2014/0244455 A1* | 8/2014 | Huang | G06T 7/00 705/31 |
| 2014/0244456 A1* | 8/2014 | Huang | G06Q 40/123 705/31 |
| 2014/0245119 A1* | 8/2014 | Barrus | G06F 40/174 715/224 |
| 2015/0180833 A1* | 6/2015 | Snow | G06F 21/6245 713/155 |
| 2015/0234790 A1* | 8/2015 | Irons | G06Q 10/10 715/273 |
| 2015/0235034 A1* | 8/2015 | Irons | G06Q 10/103 726/27 |
| 2015/0248405 A1* | 9/2015 | Rudich | G06Q 10/0631 707/608 |
| 2015/0317295 A1* | 11/2015 | Sherry | G06F 40/117 715/226 |
| 2015/0317296 A1* | 11/2015 | Vohra | G06F 16/93 715/221 |
| 2015/0319198 A1* | 11/2015 | Gupta | H04L 65/403 715/753 |
| 2016/0063645 A1* | 3/2016 | Houseworth | G06Q 50/265 705/31 |
| 2016/0140654 A1* | 5/2016 | Bhat | G06Q 40/025 705/7.26 |
| 2016/0217534 A1* | 7/2016 | Goldman | G06Q 40/123 |
| 2016/0253303 A1* | 9/2016 | Pennington | G06F 17/243 715/226 |
| 2016/0259957 A1* | 9/2016 | Knodt | G16H 10/60 |
| 2017/0032468 A1* | 2/2017 | Wang | G06Q 40/123 |
| 2017/0169487 A1* | 6/2017 | Wilczek | G06Q 30/0609 |
| 2017/0200018 A1* | 7/2017 | Boncha | G06F 21/6218 |
| 2017/0270629 A1* | 9/2017 | Fitzgerald | G06Q 40/123 |
| 2017/0286414 A1* | 10/2017 | Roebuck | G06K 9/00469 |
| 2017/0344895 A1* | 11/2017 | Roy | G06F 3/0484 |
| 2018/0033092 A1* | 2/2018 | Wang | G06Q 40/123 |

OTHER PUBLICATIONS

BB&T Securities "TurboTax Facts_20160217". http://www.bbtsecurities.com/Media/Default/pdf/TurboTax%20Facts_20160217.pdf. (Based on file name, publication date is Feb. 17, 2016). (Downloaded on Jul. 7, 2018). (Year: 2016).*

"TurboTax 2016 Release Date (For Tax Year 2015)". URL: http://www.softwarevoucher.com/turbotax-2015-release-date/. (Publication Date: Jan. 19, 2016). (Downloaded on Jul. 9, 2018). (Year: 2016).*

Tom Copeland. "A Guide to TurboTax 2015—Part I". URL: http://tomcopelandblog.com/a-guide-to-turbotax-2015-part-i. (Publication Date: Jan. 19, 2016). (Downloaded on Jul. 9, 2018). (Year: 2016).*

Tom Copeland. "A Guide to TurboTax 2015—Part II". URL: http://tomcopelandblog.com/a-guide-to-turbotax-2015-part-ii. (Publication Date: Jan. 19, 2016). (Downloaded on Jul. 9, 2018). (Year: 2016).*

Metadata | Definition of Metadata at Dictionary.com. https://www.dictionary.com/browse/metadata?s=t. Taken from Collins English Dictionary—Complete & Unabridged 2012 Digital Edition. (Year: 2012).*

* cited by examiner

Attach PDF Files

 A PDF file named 'Attachment (2).pdf' already exists as an attachment in the ProSeries Attachments directory for this return. Please review current attachments in the E-File - Attach PDF Files... menu.

OK    Help

FIG. 9

Attach PDF Files

 PDF file successfully attached

The PDF file you have attached will be transmitted with this return when you electronically file.

☐ Don't show this dialog again.

ProSeries Attach PDF Files

Attachments for KSP Attachments 3 1065 KS return.

Review the list of attachments for this return and add descriptions. — 176

| Attachment | Type | Form/Schedule and Description |
|---|---|---|
| Attachment (1).pdf | Other ▼ | Test Decs |
| Attachment (2).pdf | Line4 ▼ | Form K-120S Line 4 Schdule |

Add Attachment

Remove Attachment

Note: The IRS requires specific descriptions for signed 8453 and 8283 attachments. You can select 8453 on 8283 from the 'Type' column, next to your attachment and the description will be added automatically. <u>Tell Me More</u>

OK    Cancel    Print List    Help 174
176
178
180

FIG. 13

SYSTEMS, METHODS AND APPARATUS FOR ATTACHING ELECTRONIC DOCUMENTS TO AN ELECTRONIC TAX RETURN

BACKGROUND

Embodiments of the present invention are directed to systems, methods, and articles of manufacture for preparing an electronic tax return and attaching an electronic document to the electronic tax return referenced to a particular form field of the tax return.

Computerized (also referred to as "electronic") tax return systems have become very popular and allow a user, such as a taxpayer or a tax professional, to prepare and electronically file a tax return using a computing device (e.g. personal computer, tablet computer, smart phone, etc.). The tax preparation systems typically comprise a computer system having an electronic tax return software application. The tax preparation system may be a desktop computer having a tax preparation application that resides and operates on the computer operated by the user or an online system having a tax preparation application that resides on a server that is accessible by the user's computer via a network such as the internet. The interface for a server based system can be an internet browser or specialized software residing on the local computer. There are a number of examples of desktop software applications and online tax preparation applications for preparing tax returns. Examples of desktop applications are TurboTax® software for Microsoft Windows® based personal computers ("PC") and Apple® Mac® computers, ProSeries® and Lacerte® tax preparation applications, which are known consumer and professional tax preparation applications available from Intuit Inc., Mountain View, Calif., H&R Block TaxCut software, available from H&R Block, Inc., Kansas City, Mo., and TaxACT® software available from $2^{nd}$ Story Software, Inc. Examples of online tax return preparation applications are Turbotax® Online, H&R Block Online tax prep, and TaxACT® Online.

Whether a desktop system or an online system, the use of the application to prepare a computerized tax return is basically the same. For example, certain tax preparation applications present a list of tax-related questions or data entry fields to the user as a series of interview screens or fillable forms, in response to which the user enters the appropriate tax data and/or answers if they are known. For example, certain interview screens or questions may relate to personal and family information such as the user's social security number, marital status, number of dependents, etc. Other interview screens and questions may relate to the taxpayer's finances such as wages, retirement plan contributions, and social security, state and federal taxes that were paid or withheld as provided in Form-W2. The data fields of an electronic tax return may be entered in many other ways, as well. For example, data may be entered into the electronic tax return by filling in data fields in a fillable form, the data may be electronically imported from financial service providers of the taxpayer (such as banks, stock brokers, financial planners, etc.), the data may be transferred from another database on the computer or remotely stored on a different computer or storage device/server, and/or the data may be transferred from a previous year's tax return, or from any other suitable source.

Further, an electronic tax return may be a business or corporate return, and the tax data fields may, for example, relate to payments and benefits such as contributions to a retirement plan. Thus, data fields may relate to travel expenses or determinations of portions of expenses that are deductible.

Upon entry of all of the taxpayer data, the tax preparation system prepares an electronic tax return. The electronic tax return is then processed and formatted into an electronic tax return data file according to the requirements and specifications of the pertinent tax agency to which the tax return is being filed. Finally, the electronic tax return data file is filed with the appropriate tax authority such as the Internal Revenue Service (IRS), a state tax authority (e.g. California Franchise Tax Board), city tax authority, or other tax collecting agency, by transmitting the electronic tax return data file to the tax authority. Alternatively, the tax return data file can used to create a paper forms submission in which the tax return forms are printed and then submitted to the appropriate tax authority.

During the preparation of an electronic tax return by a tax preparer (e.g., a taxpayer or professional tax preparer), supporting documents, such as W-2 forms, 1099 forms, various tax return schedules, etc., may be required to be attached to a tax return for submission to the tax agency. The tax preparer typically needs to provide additional information such as descriptive text and identification of the form and field to which the supporting document is related.

SUMMARY

One embodiment of the present invention is directed to a tax return preparation system (also referred to as a "tax preparation system") configured to prepare a tax return for a taxpayer in which a supporting document in electronic form may be attached to the tax return and automatically related to a specific form field without the tax preparer having to provide the additional information previously required to relate the supporting document to the specific form field. Typically, the tax preparation system comprises one or more computer(s) (such as a personal computer, tablet computer, mobile phone, smartphone, website server, etc.) in which the computer(s) include at least one computer processor, memory, a storage device and a tax preparation software program configured to program the computer to allow a user (e.g., a tax preparer) to prepare an electronic tax return for a taxpayer. The computer(s) of the tax preparation system may also be connected through one or more communication networks, such as the internet via a website server and/or a private network, to communicate with users and/or sources of tax data and information. Thus, a user can utilize the tax preparation system, for example, by accessing a website, or through other suitable means, such as direct access to the computer(s) of the system, or through a private network, or even through a mobile communication device such as a mobile phone or smartphone. The data store is in communication with the computer(s) and is configured to store taxpayer tax data which can be read and/or written to by the computer(s).

Within the tax preparation system, the tax preparation software programs the computer to perform a process for preparing a tax return for a taxpayer. For instance, the process may include accessing taxpayer tax data for the taxpayer. This may be done by any suitable means, such as by displaying a tax data input screen requesting tax data for a particular form field (e.g., a first form field) of the tax return. The tax data input screen may be displayed as an interview screen a part of an interview or as plurality of form fields (e.g., an electronic form which looks the same or similar to a paper copy of a tax form) having input fields into which the user can input tax data. Some form fields of various tax return forms require or allow a supporting document to be submitted with the tax return. For instance, the requested tax data may be for the form field of state and municipal interest paid by the taxpayer. This line item of a Form K-120S for a partnership of S corporation tax return requires a supporting document to be filed along with the tax return in the form of a required schedule. Thus, in the situation that the first form field requires or allows a supporting document to be submitted with the tax return in support of the first form field, the system performs a process for associating a supporting document to a specific form field of the tax return and attach the supporting document to the tax return.

In one embodiment, when a first form field is encountered which requires or allows a supporting document, the system displays an attach document command to the user for attaching a supporting document related to the first form field. The user can then select the attach document command, such as by clicking on the command, and the system receives the selection of the attach document command from the user. In response to the selection of the attach document command, the system displays a file selection function to the user which allows the user to select a document file to be associated with the first form field. As an example, this may be a pop-up window which allows the user to browse the file folders and files on a storage device (which may be the storage device of a user's computer, a storage device of the tax preparation system computer, or other storage device), and then select a supporting document file.

The system receives a selection of a document file from the user using the file selection function. The system then generates a data record associating the selected document file with the first form field. The data record may be a separate data record or it may data written to or attached to the selected document file. The system attaches the selected document file to the completed tax return for submission to the relevant tax agency.

Once the tax preparation system obtains all of the tax data for completing the tax return, the tax preparation system analyzes the taxpayer tax data, calculates the tax return based on the tax data and the relevant tax rules and regulations, and then generates a tax return for filing with the relevant tax agency. The tax return has the selected document file attached to the completed tax return. The tax preparation system may generate the tax return in an electronic format for electronically filing the tax return with the tax agency, and/or it can print a paper version of the tax return which can be transmitted to the tax agency, such as by generating a printable file format (e.g., a pdf, tiff, etc.) or generating print data which can be sent to a printer.

In another aspect of the present invention, the tax data input screen displayed by the tax preparation system includes a form which looks the same or similar to the actual tax form, and has a plurality of form fields of the tax return. Each of the form fields has a data input field in which the user can enter tax data for the form field. The tax data input screen is configured such that the user can use a computer input device such as a mouse, touchpad, touchscreen, trackball, etc., to select one of the form fields. The selection may be made by clicking on a form field to place a cursor in the form field to input tax data into the form field. The system receives the selection of the selected form field from the user from among the plurality of form fields. The system may display the attach document command in response to receiving the selection of the form field, such as displaying a pop-up window.

In still another aspect of the present invention, the tax preparation software program may also program the system to generate and display a document management screen to the user. The document management screen allows a user to review and/or modify the supporting documents attached to the tax return. The document management screen includes a list of supporting document files attached to the tax return. The screen may also include a selectable add attachment command, and a selectable remove attachment command. The document management screen is configured to allow the user to select a document file from the list of document files and remove the selected document file from the tax return by selecting the remove attachment command. The screen also allows the user to add a document file to the tax return by selecting the add attachment command. The document management screen may also display a description of each supporting document file, such as the type of document, and the form field to which the document file is associated (and thus supports).

In yet another aspect, the tax preparation software program may also program the tax preparation system to allow a user to remove a document that was previously selected and associated with the first form field. The system displays a selectable remove document command to the user for removing a supporting document related to the first form field. The remove document command may be displayed in the same manner as the attach document command, as described herein. The user selects the remove document command in relation to the first form field and the system receives the selection of the remove document command from the user. The system then modifies or deletes the data record previously generated to associate the attached document file to indicate that the document file is not associated with the first form field. The system then removes the document file from the tax return if it was previously attached to the tax return.

Another embodiment of the present invention is directed to computer-implemented methods for preparing an electronic tax return. For example, the method may include a tax preparation system, same or similar to that described above, executing a tax preparation software program to prepare a tax return for a taxpayer. The method comprises displaying a tax data input screen to a user requesting tax data regarding the taxpayer for a first form field of a tax return; displaying a selectable attach document command to the user for attaching a supporting document related to the first form field; receiving a selection of the attach document command from the user; displaying a file selection function to the user which allows the user to select a document file to be associated with the first form field; receiving a selection of a document file from the user; generating an electronic data record associating the selected document file with the first form field; and attaching the selected document file to the tax return.

In additional aspects of the present invention, the computer-implemented method may also include any of the additional aspects described herein for the system for analyzing tax data and determining and displaying a tax summary.

Another embodiment of the present invention is directed to an article of manufacture comprising a non-transitory computer readable medium embodying instructions executable by a computer to execute a process according to any of the method embodiments of the present invention for preparing an electronic tax return. For instance, the non-transitory computer readable medium embodying instructions executable by a computer may be configured to execute a process comprising: a tax preparation system, same or similar to that described above, executing a tax preparation software program to prepare an electronic tax return. The process comprises: displaying a tax data input screen to a user requesting tax data regarding the taxpayer for a first form field of a tax return; displaying a selectable attach document command to the user for attaching a supporting document related to the first form field; receiving a selection of the attach document command from the user; displaying a file selection function to the user which allows the user to select a document file to be associated with the first form field; receiving a selection of a document file from the user; generating an electronic data record associating the selected document file with the first form field; and attaching the selected document file to the tax return.

In additional aspects, the article of manufacture may be further configured according to the additional aspects described herein for the tax preparation system and/or method for preparing an electronic tax return.

It is understood that the steps of the methods and processes of the present invention are not required to be performed in the order as shown in the figures or as described, but can be performed in any order that accomplishes the intended purpose of the methods and processes.

The tax preparation systems and methods of the present invention provide improved user interfaces, document linking, user experience and user interactions with computer generated interfaces and computerized tax return preparation applications for more efficient and accurate tax return preparation while eliminating the need for users to search for and view supporting documents which may involve launching of additional applications and computer processing. As a result, the present invention improves the functioning of the computer by providing faster and more flexible preparation, computing and generation of tax forms. The tax preparation systems and methods allow more efficient preparation of tax returns by allowing a user to attach documents to a particular form field, automatically associating supporting documents to a particular form field and automatically determining descriptions for attached supporting documents. Thus, the present invention improves various technologies and/or technical fields, including the computerized preparation of tax return forms. Accordingly, the present invention is rooted in computer technology involving specific computer components, intercommunications between computing modules, data structures and logic structures which improve the operation of the computer and also improve the technologies and technical fields recited above.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant:

FIGS. 4-13 are various screen shots of an example of a process performed by the tax preparation system to associate and attach a supporting document to a specific form field of a tax return, according to one embodiment of the present invention;

DETAILED DESCRIPTION OF ILLUSTRATED EMBODIMENTS

Embodiments of the present invention are directed to systems, methods and articles of manufacture for preparing an electronic tax return in which a supporting document can be associated with a specific form field of the tax return and attached to the tax return. In general, a computerized tax preparation system comprises a computer system having one or more computer(s) having at least one computer processor, memory, a data storage device for storing and reading taxpayer tax data, and a tax preparation software program executing on the computer(s). The tax preparation system is configured to prepare a tax return for a taxpayer by obtaining tax data regarding the taxpayer. During the process of obtaining the tax data, the system displays a tax data input screen for a user to input tax data for a current form field of the tax return being worked on, such that the system identifies the context of the tax data being input. The system determines that a supporting document is required or allowed for the current form field and displays a command to attach a supporting document in the context of the current form field. When a user selects the command, the system displays a file selection function (e.g., a file selection window) which allows the user to select a document file as the supporting document for the current form field. The user may browse file folders and/or storage devices to select a document file. The system receives the selection of the document file and associates the selected document file with the current form field. The system also accesses metadata associated with the current form field and uses the metadata to automatically associate a document description (such as a document type) to the selected document file. When generating the electronic tax return, the system includes the document description for the document file and attaches the document file to the tax return.

Figure 1:
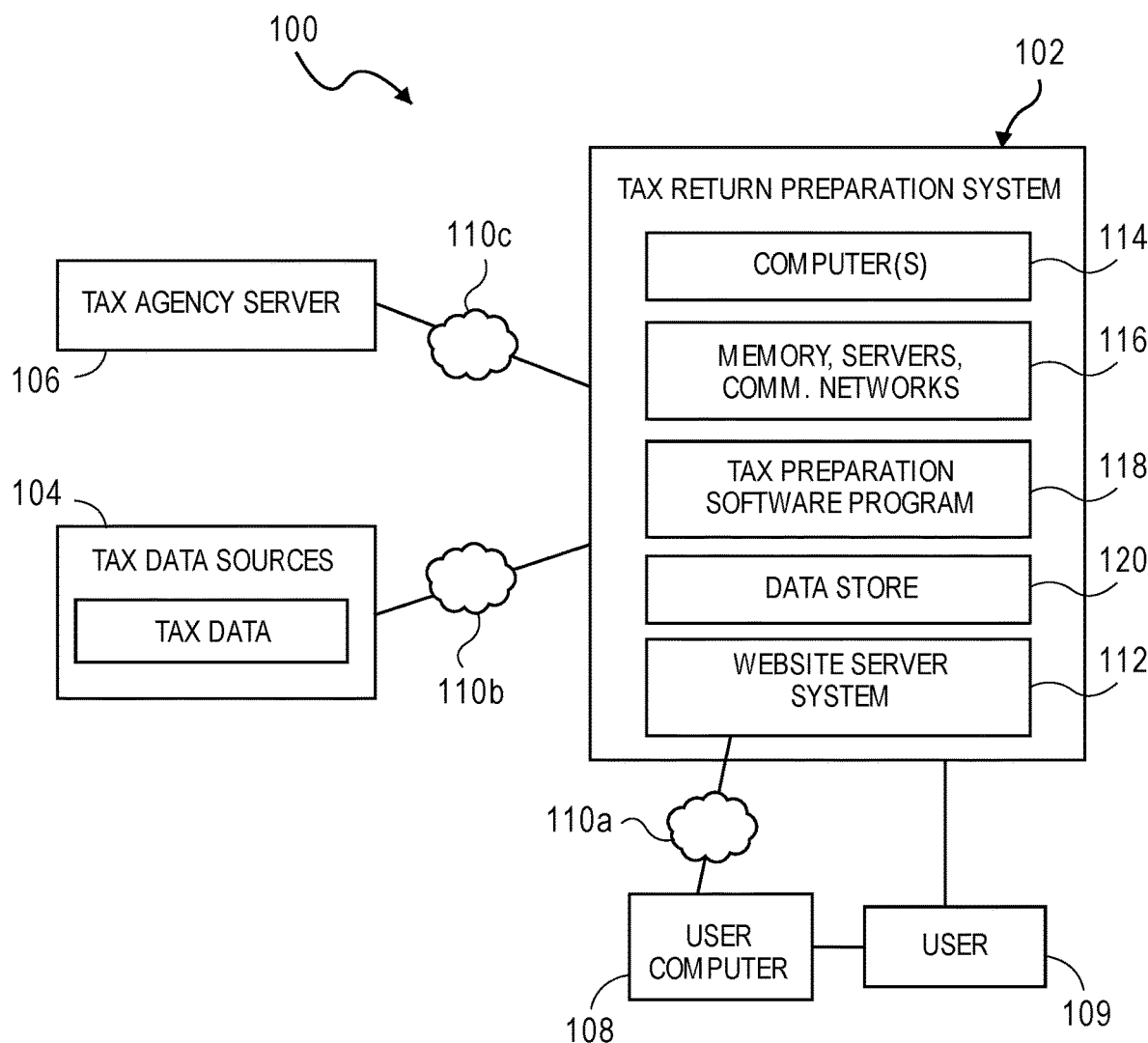
FIG. 1 illustrates an exemplary tax preparation system for preparing an electronic tax return, according to one embodiment of the present invention.

Referring to FIG. 1, in one embodiment, a block diagram of a computerized tax system 100 for preparing an electronic tax return is shown. The electronic tax return system 100 comprises a tax preparation system 102 which may be in communication via one or more communication networks 110a, 110b, and 110c, with various tax data sources 104, a tax agency server 106, and/or a user computer 108. Each of the networks 110a, 110b and 110c may include a proprietary network, LAN, WAN, cellular network, wireless network, the internet and/or other suitable network. The tax preparation system 102 and/or web site server system 112 may be operated by a tax preparation services provider, a third party service provider, a financial institution or by a third party host. One example of a third party host that provides website servers for providing online financial services for financial institutions and their customers is INTUIT FINANCIAL SERVICES™.

The tax preparation system 102 may be an online system which is accessed by a user's computer 108 via a communication network 110a, such as the internet, or it may be a local system which runs on a user computer 108 of a user 109. The block diagram of FIG. 1 illustrates an online tax preparation system 102 having a web site server system 112 hosting a website for an online tax preparation application which is accessed by the user computer 108 over the communication network 110a, typically the internet, although it could be any suitable network, as described above.

The tax preparation system 102 comprises: one or more computer(s) 114; peripheral hardware 116 such as memory, servers, communication networks, etc.; a tax preparation software program 118 executable by the computer(s) 114; a website server system 112; and a data store 120 for reading and writing taxpayer tax data. The computer 114 may be any suitable computing device, including a mainframe computer, a personal computer (including a desktop computer, laptop computer or tablet computer), a server computer, a smartphone, or other suitable computing device. In the case of a local system, the computer 114 may be a personal computer, such as a desktop computer, laptop computer or tablet computer, a handheld computing device, a smartphone, a mobile phone capable of running applications, or other suitable computing device.

Figure 2:
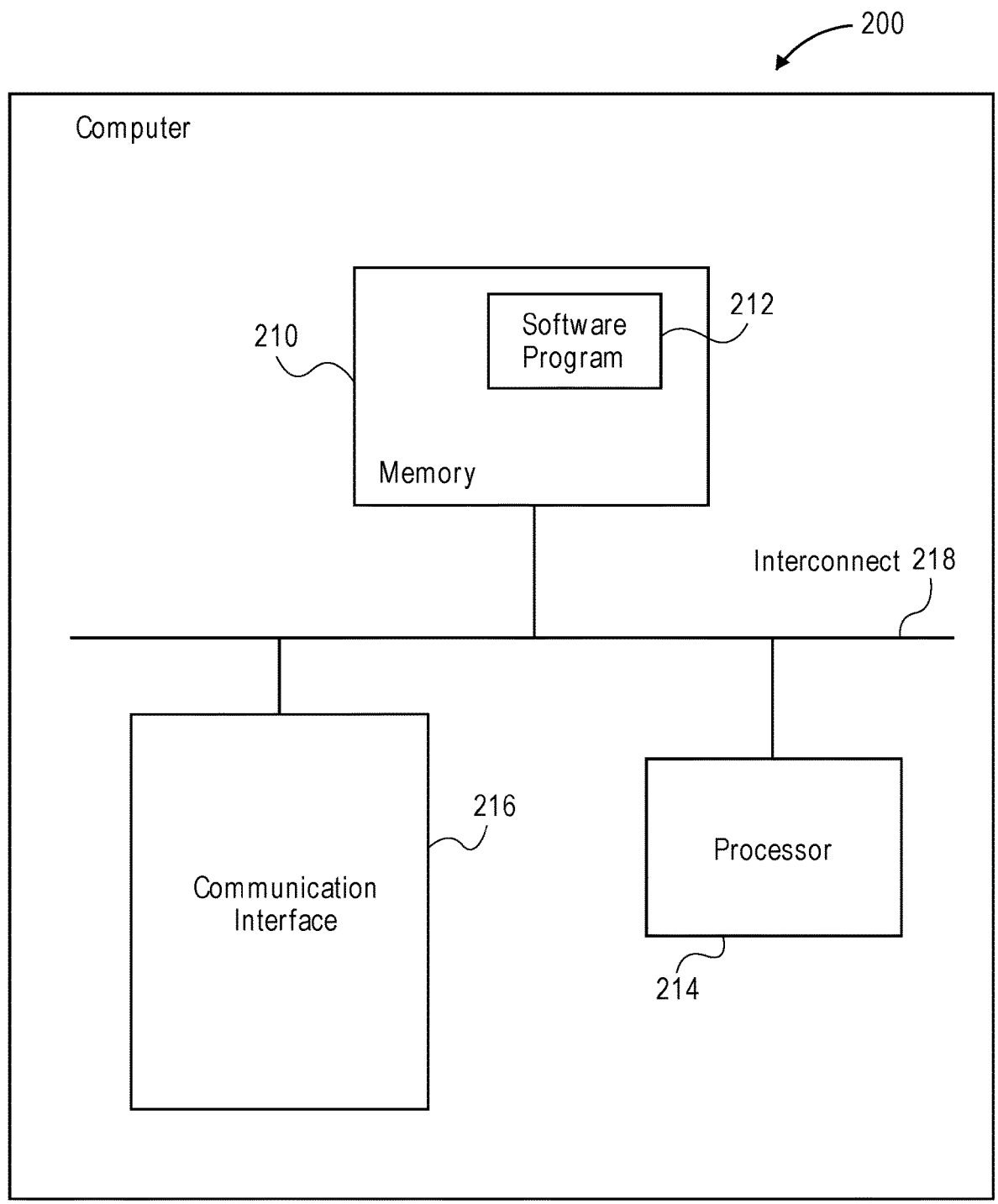
FIG. 2 is a block diagram of a computing device (computer) which may be utilized in the system of FIG. 1.

FIG. 2 generally shows a block diagram of the components of an example of a computer (computing device) 200 that may be used as the computer in the computers and servers identified in the system 100 of FIG. 1, such as the computer(s) 114, servers 116 and website server system 112 of the tax preparation system 102, and the user computer 118. The computer 200 includes memory 210, an application software program 212, a processor or controller 214 to execute the application software 212, a network or communications interface 216, e.g., for communications with a network or interconnect 218 between the components. The memory 210 may be or include one or more of cache, RAM, ROM, SRAM, DRAM, RDRAM, EEPROM, SDRAM and other types of volatile or non-volatile memory capable of storing data. The processor unit 214 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 218 may include a system bus, LDT, PCI, ISA, or other types of buses, and the communications or network interface may, for example, be an Ethernet interface, a Frame Relay interface, or other interface. The network interface 216 may be configured to enable a system component to communicate with other system components across a network which may be a wireless network or various other communication networks. It should be noted that one or more components of computer 200 may be located remotely and accessed via a network. Accordingly, the system configuration provided in FIG. 2 is provided to generally illustrate how embodiments may be configured and implemented.

The tax preparation system 102 may be in communication with one or more sources of taxpayer tax data 104 through a communication network 110b. The tax data sources 104 may include financial services providers (such as banks, credit unions, brokerages, investment advisors) at which the taxpayer has financial accounts, tax preparation services utilized by the taxpayer, credit reporting bureaus, government databases, etc.

The tax preparation system 102 may also be in communication with a tax agency server 106 for electronically receiving completed electronic tax returns, such as the Internal Revenue service, a state tax authority, or other tax collecting entity, through the communication network 110c. Thus, the tax preparation system 102 may function as an electronic filing server such that the tax preparation system 102 can electronically file a completed tax return. The tax preparation system 102 may also be configured to request extensions of time, make electronic tax payments, and/or execute other tax related transactions.

In the case of an online system, the tax preparation system 102 also comprises a website server system 112 which enables a website for a user 109 using a user computer 108 to access and use the tax preparation system 102. The website server system 112 comprises one or more computers, servers and website servers, as well as software programming and web pages for providing a website. The website server system 112 may be part of an online financial services system which provides a multitude of online services to clients or tax preparation services system for providing tax preparation services, or it may be a standalone/dedicated system for providing tax preparation and filing services. The website server system 112 is in communication with a communication network 110c, such as the internet, so that the website is accessible over the internet, such as through the use of a web browser on a user's computer or a dedication application (app) on a user's computer.

In the case of a local system, such as an application or software program running on the user computer (e.g., an "app" running on a smartphone or tablet computer), the block diagram of FIG. 1 would simply be modified by making the user computer the tax return preparation system 102, in which case the tax return preparation system 102 would not require the website server system 112. The user 109 downloads or otherwise loads the tax preparation software application 118 onto the user computer 109, and if necessary, installs the application on the computer. The user computer 108 may be any suitable computing device, such as a desktop computer, laptop computer or tablet computer, a handheld computing device, a smartphone, a mobile phone capable of running applications, or other device.

Then, the user 109 simply runs the tax preparation application 118 on the computer 108, and the computer 108 performs the processes for preparing the electronic tax return as described below. The user computer 108 is in communication with sources of tax data 104 and a tax agency server 106 via communication networks 110b and 110c, similar to the tax preparation system 102, as described herein.

Figure 3:
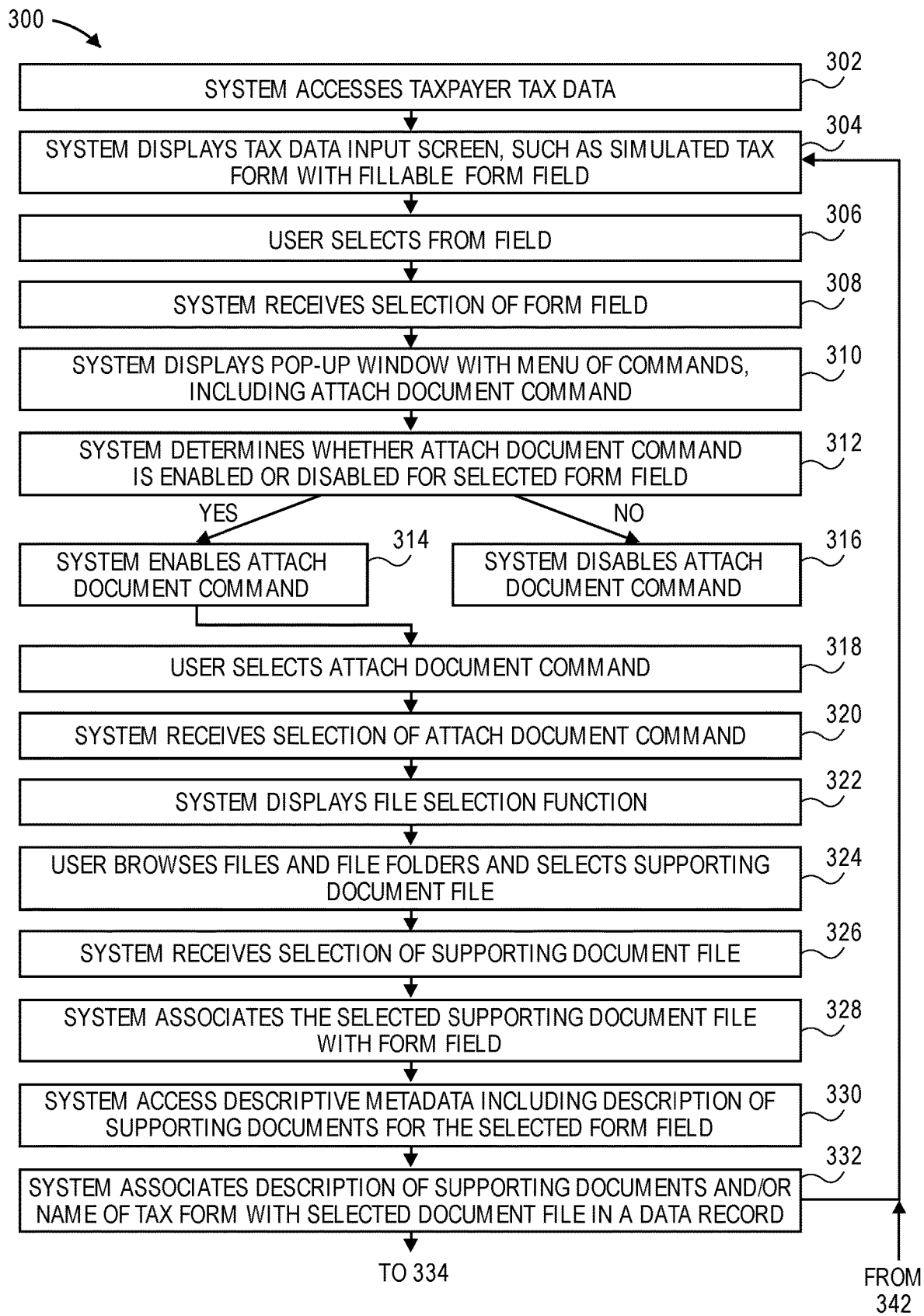
FIG. 3 is a flow chart of a process performed by the tax preparation system to prepare an electronic tax return, including associating and attaching a supporting document to a specific form field of the tax return, according to one embodiment of the present invention.
Figure 3:
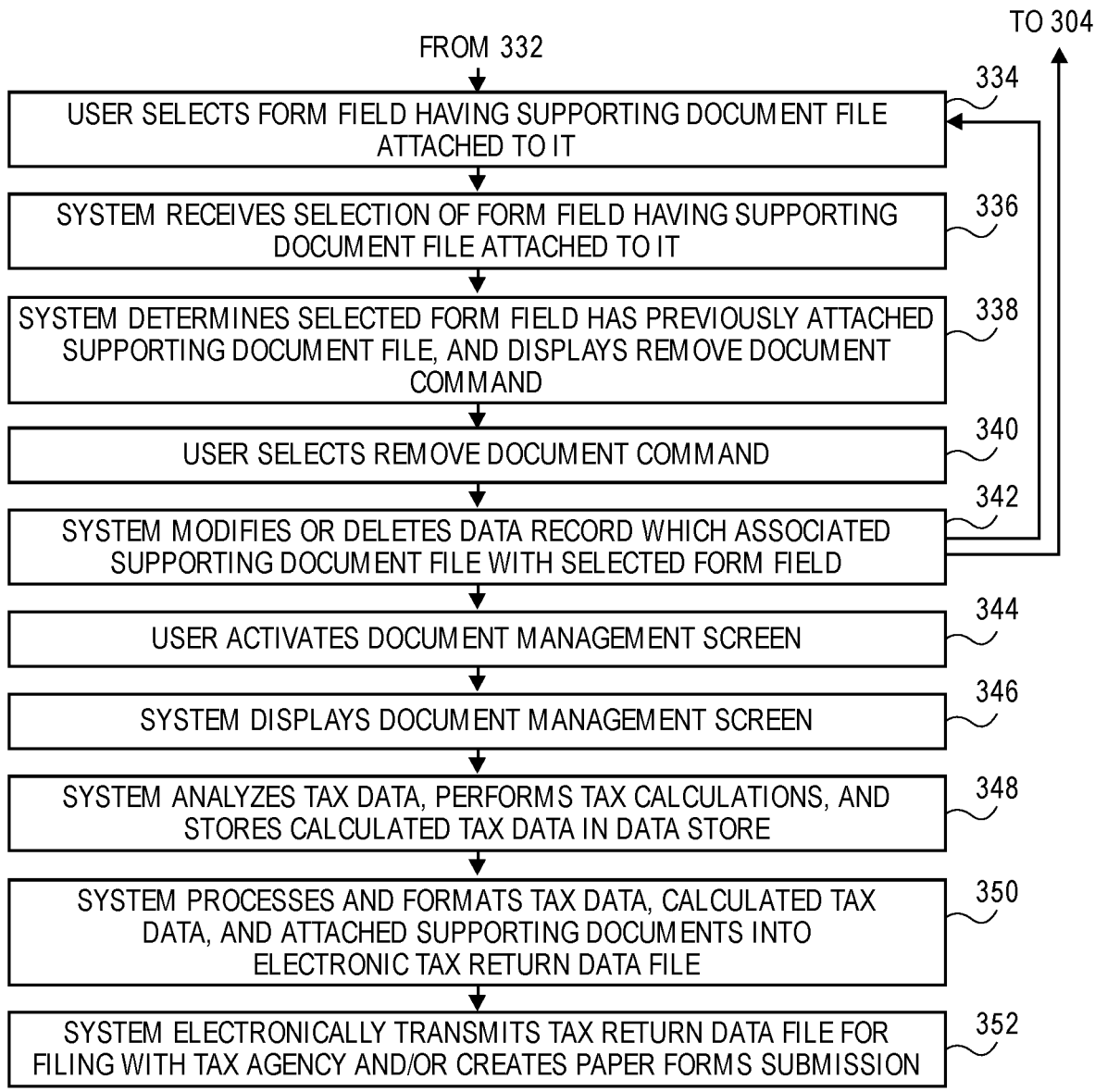
Figure 4:
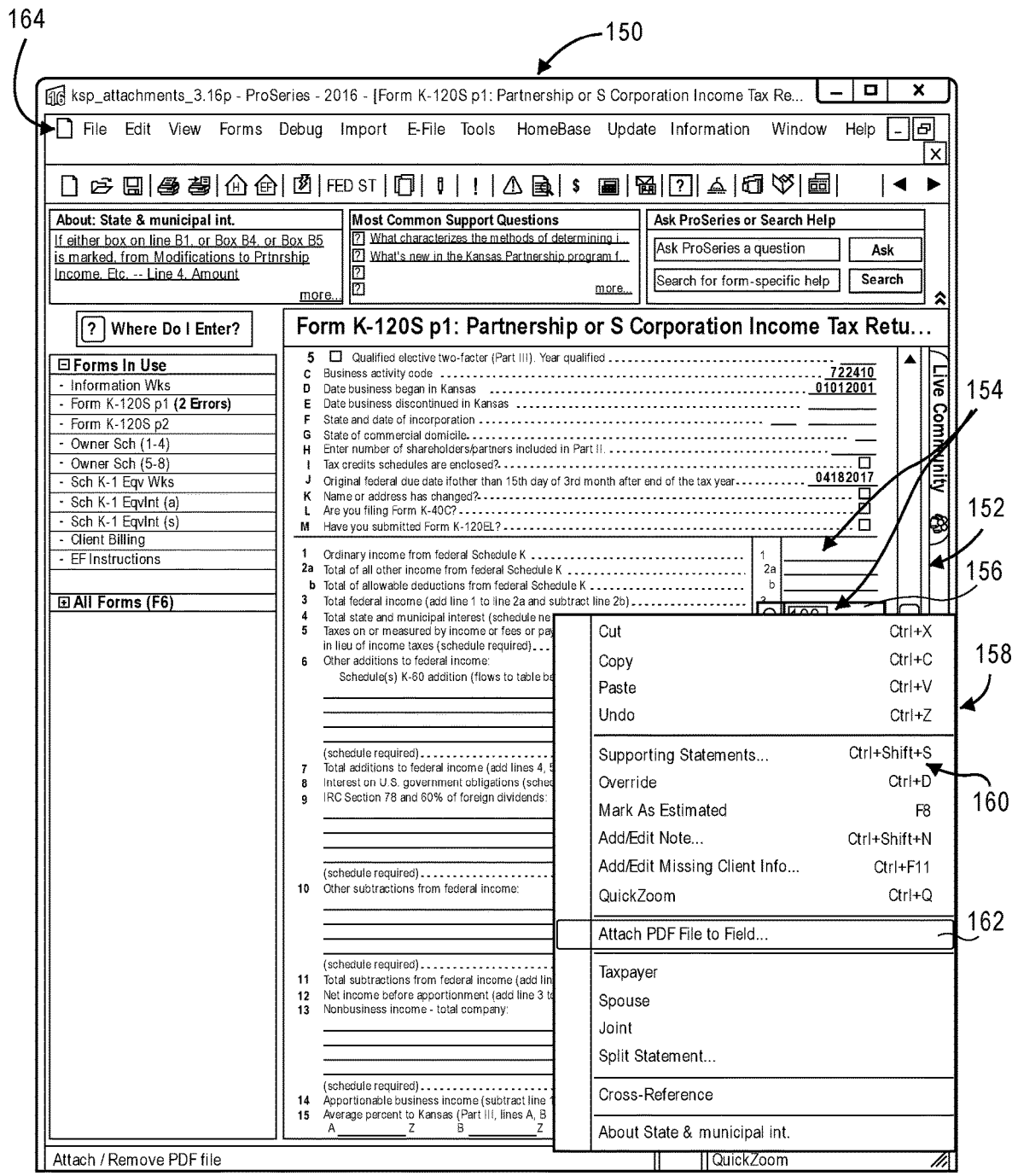

Whether an online system or a local system, the tax preparation system 102 is configured to execute the tax preparation software program 118 to prepare an electronic tax return, including attaching supporting documents. The flow chart of FIG. 3 shows algorithms for a process 300 for preparing a tax return, according to one embodiment of the present invention. At step 302, the tax preparation system 102 accesses taxpayer tax data regarding a taxpayer for a tax year (e.g., the current tax year) for which an electronic tax return is being prepared. The tax preparation system 102 may access the taxpayer tax data for calculating a tax return for the taxpayer by any suitable method. For example, the tax preparation system 102 may present to the user a tax data input screen, such as series of interview screens or fillable forms which mimic actual paper tax forms to which the user responds by entering appropriate tax data and answers. In this example embodiment of process 300, the tax data input screen comprises a simulated tax form having a plurality of form fields having fillable input fields into which the user can input tax data. Accordingly, at step 304, the system 102 displays to the user a simulated tax form having fillable input fields. FIG. 4 shows a screen shot 150 of an example of a simulated tax form 152 for Form K-12S of a federal partnership of S corporation tax return. The tax form 152 has a plurality of form fields 154 each having input fields 156.

The tax preparation system 102 may also obtain taxpayer tax data by electronically accessing tax data directly from tax data sources 106 via the communication network 110*b*. For instance, the user may give the tax preparation system 102 permission, and/or usernames and passwords, if necessary, to access taxpayer account data from financial services providers (such as banks, credit unions, brokerages, investment advisors) at which the taxpayer has financial accounts, or tax data from tax preparation services, or data from credit reporting bureaus, or data from government databases, etc. The tax preparation system 102 stores (i.e., writes) the accessed tax data in the data store 120.

At step 306, the user selects one of the form fields 154, such as the form field 154 for line 4 of Form K-120S as shown in FIG. 4. Line 4 of Form K-120S requires a supporting document (in the form of a schedule for Line 4) to be attached to the form. The user may select a form field 154 by clicking on the form field 154 using an input device such as a mouse, touchpad, touchscreen, trackball, etc. Selecting a form field 154 may place a cursor or activate a data input function in the input field 156 of the selected form field 154 to allow a user to input tax data into the selected form field 154. At step 308, the system 102 receives the selection of the selected form field 156 from the user from among the plurality of form fields 154. At step 310, the system 102 displays pop-up window 158 having a menu 160 of commands, including an attach document command 162 (see FIG. 4). The system 102 may display the attach document command 162 in response to receiving a selection of a form field 156, or it may be displayed by any other suitable method. For example, alternative to a pop-up window, the attach document command 162 may be displayed by other methods, such as selecting a function, using a dropdown toolbar, etc.

Figure 5:
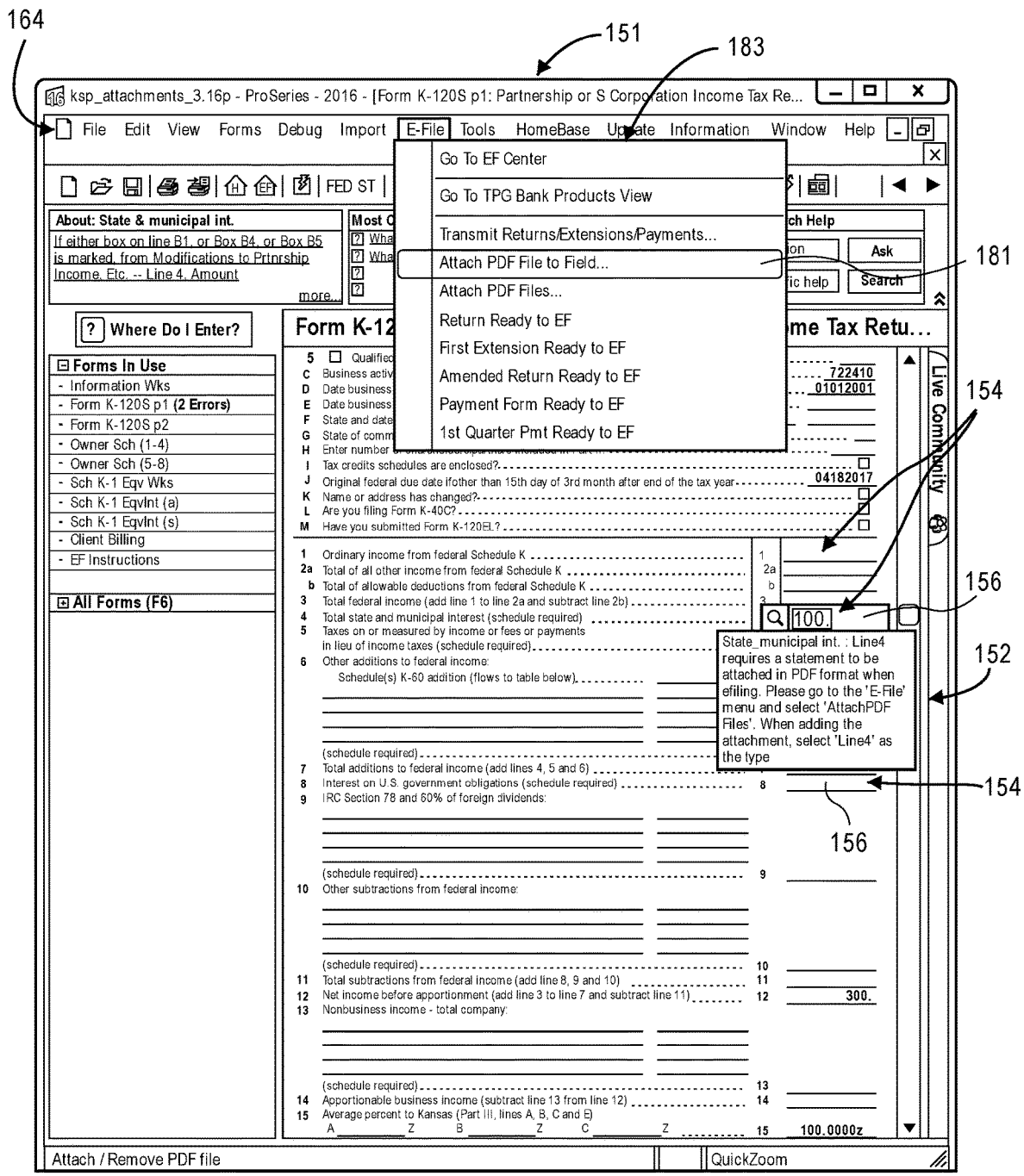
Figure 6:
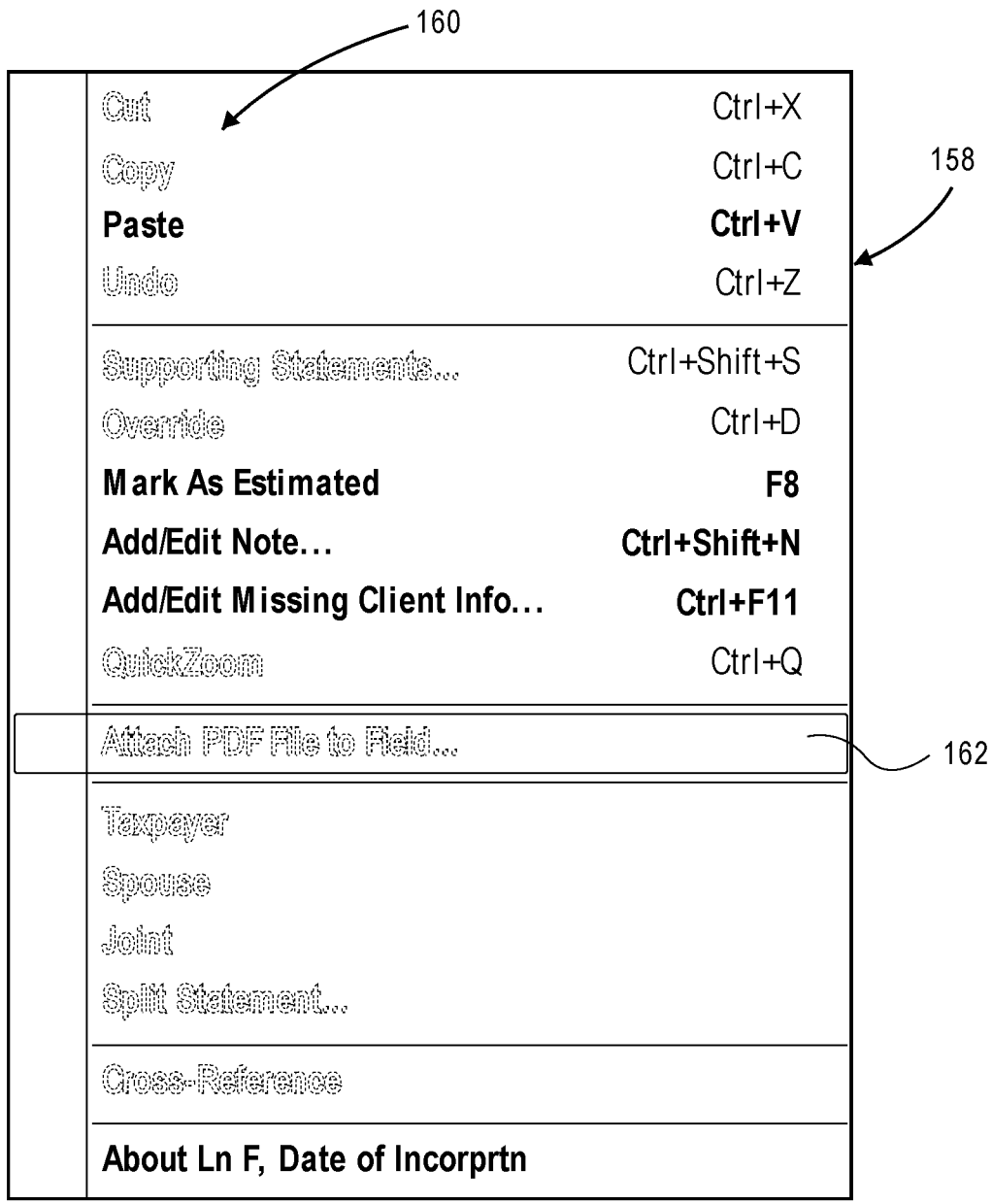
Figure 7:
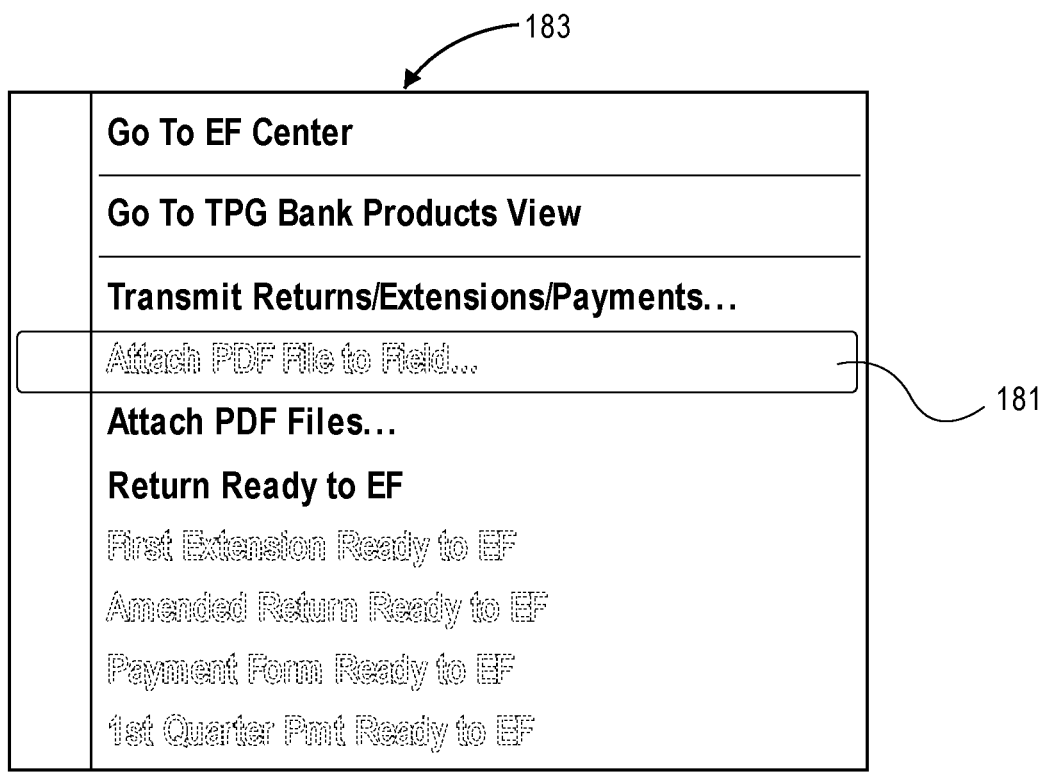

At step 312, the system 102 determines whether the attach document command 162 is enabled or disabled for the selected form field 154. The attach document command 162 may be enabled or disabled based on a setting of each form field 154. In other words, when the attach document command 162 is "enabled" for a particular form field 154, the command can be operated by the user, and when the attach document command is "disabled" for a particular form field 154, the command cannot be operated by the user attempting to select the command. The status of the attach document command 162 may be indicated to the user, by any suitable means. For example, in FIG. 4, the attach document command 162 is shown in solid typeface indicating the command 162 is enabled. In addition, as shown in screen shot 151 of FIG. 5, the dropdown menu for the E-File menu of the main toolbar 164 also shows the attach document command 162 in solid typeface indicating the attach document command is enabled for the selected form field 154. In contrast, FIG. 6 shows a pop-up window 158 in which the attach document command 162 is shown in grayed typeface (also known as "grayed out") indicating that the attach document command 162 is disabled. Similarly, as shown in FIG. 7, the dropdown menu for the E-File menu 183 of the main toolbar 164 also shows the attach document command 162 in grayed typeface indicating the attach document command is enabled for the selected form field 154. Alternatively, or in addition, the attach document command 162 in the pop-up window 158 and/or in the dropdown E-File menu 183 of the main toolbar 164 could include a word indicating the status of the command, such as "enabled" or "disabled", different colors to indicate the status, or other suitable indicator. Accordingly, each form field 154 includes a setting as to whether the form field 154 allows or requires a supporting document to be attached to the tax return. For instance, each form field 154 may be associated with a metadata record which includes a supporting document entry as to whether a supporting document is allowed or required for the respective form field 154. When a user selects a form field 154, the system 102 checks (e.g., accesses and reads) the metadata record for the form field 154 to determine whether the selected form field 154 allows or requires a supporting document. At step 314, when the metadata record for the selected form field 154 indicates the form field 154 allows or requires a supporting document, the system 102 enables the attach document command 162 and displays the command 162 as being enabled. At step 316, when the metadata record for the selected form field 154 indicates the form field 154 does not allow or require a supporting document, the system 102 disables the attach document command 162 and displays the command 162 as being disabled.

At step 318, the user selects the attach document command 162, for instance, by moving a cursor or highlighting the command using an input device, and clicking on the attach document command 162. In response to the user selecting the attach document command 162, at step 320, the system 102 receives a selection of the attach document command 162.

Figure 8:
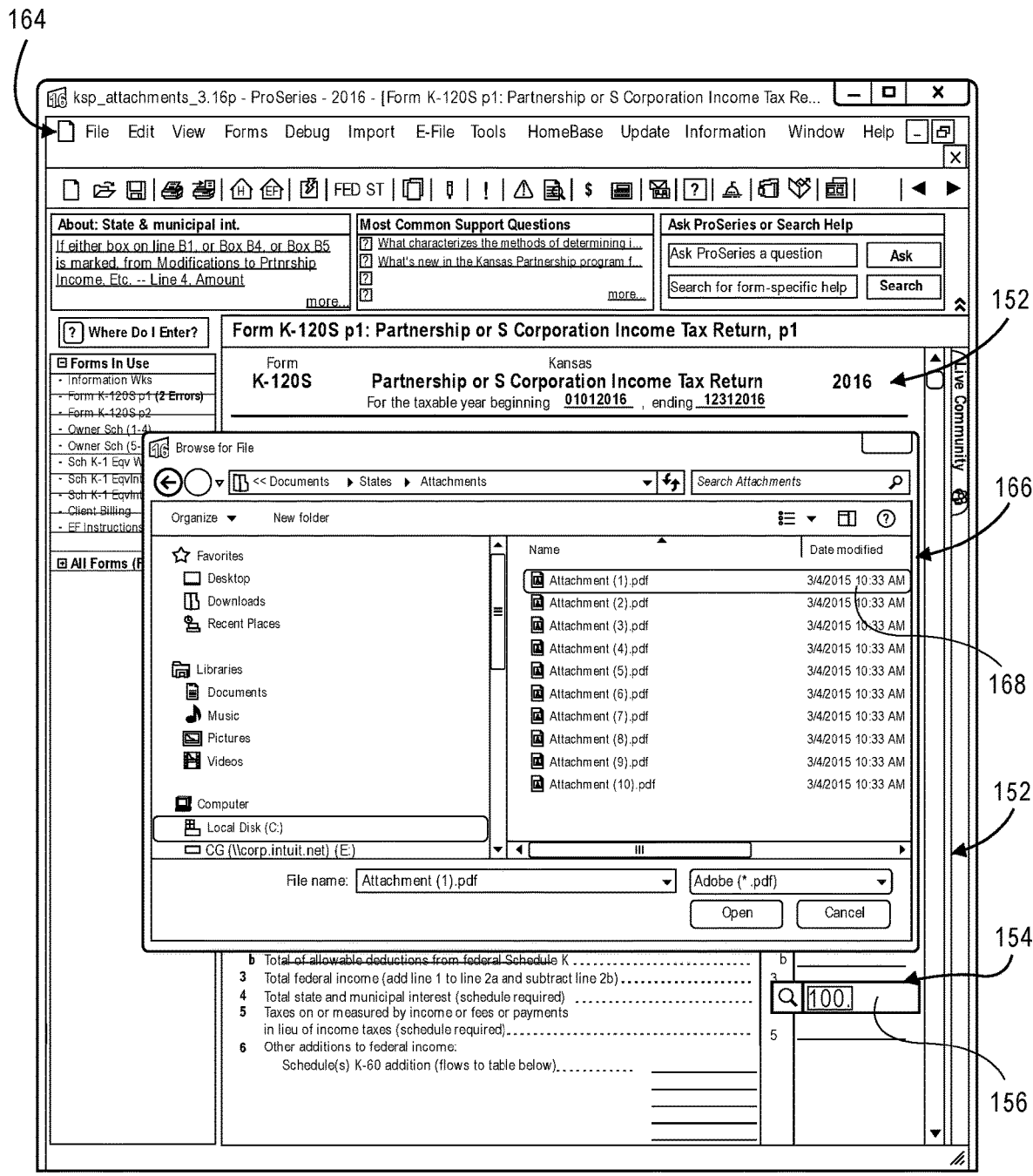

At step 322, in response to receiving the selection of the attach document command 162, the system 102 displays a file selection function 166, as shown in FIG. 8. The file selection function 166 may be a pop-up file browsing and selection window 166 as shown in FIG. 8, or any other suitable file selection function which allows a user to browse and select a file. The file selection function 166 enables a user to browse files and file folders on a local computer, files and file folders on a local network, and/or files and file folders on a storage device accessible via a wide area network such as the internet. At step 324, the user browses the files and file folders using the file selection function 166 and selects a supporting document file 168, or multiple supporting document files 168, to attach to the selected form field 154.

At step 326, the system 102 receives the selection of the supporting document file(s) 168 from the user. The tax preparation system 102 may then determine whether the selected document file 168 has already been attached to another form field 154 (i.e., a form field different than the currently selected form field) for the current tax return being prepared. When the system determines that a selected document file 168 has previously been attached to another form field 154, the system 102 displays a warning message 179 (see FIG. 9) to the user advising that the selected document file 168 was already attached to another form field 154, and advising the user to review the current attachments using the attach pdf Files command 181 (see FIG. 5) in the main toolbar dropdown "E-File" menu 183. The selection of the attach pdf Files command 181 causes the system 102 to display a document management screen 174, which allows a user to review and manage the attached document file(s), as described in more detail below. When determining that the selected document file 168 was previously attached to another form field, the system 102 does not attach the selected document file 168 to the currently selected form field 154. When the system determines that the selected document file 168 was not previously attached to a different form field 154, the system 102 proceeds to step 328.

In response to receiving the selection of the supporting document file(s) 168, at step 328, the system 102 associates the selected supporting document file(s) 168 with the currently selected form field 154. The system 102 may associate the selected supporting document file(s) 168 with the currently selected form field 154 by generating a data record which associates the selected document file(s) 168 with the selected form field 154, for example within a supporting document data table, or by any other suitable means. The data in the data record includes one or more of: an identification of the selected form field 154, an identification of the tax form 152 of the form field 154, and/or an identification and location of the selected document file(s) 168. Upon associating the selected document file(s) 168 with the selected form field 154, the system 102 may display a message 170 (see FIG. 10) to the user indicating that the selected document file(s) 168 were successfully attached to the tax return and will be transmitted with tax return upon electronically filing the tax return with the tax authority.

At step 330, the system 102 accesses descriptive metadata including a description of the supporting documents to be associated with the selected form field 154, and name or description of the tax form for the selected form field. At step 332, the system 102 associates the description of the supporting documents for the selected form field 154 and/or the name of the tax form with the selected document file(s) 168. Each of the form fields 154 which allows or requires a supporting document to be attached to it has descriptive metadata associated with the form field. The descriptive metadata may be stored in the same metadata record having the supporting document entry as to whether a supporting document is allowed or required, as described above, or a separate metadata record. The descriptive metadata, as well as the supporting document entry metadata, are pre-defined and built into each tax form as part of the tax preparation software program 118. Typically, a tax preparation software developer obtains the schema for a particular tax return and/or tax form of a tax return, and uses the schema to develop the tax preparation software program 118 to meet all of the requirements of the schema, including the required tax data, tax calculations, supporting documents, electronic tax return format, etc. Thus, the metadata is built into the tax preparation software program 118, although it may be a separate module or data package of the tax preparation software program 118. Accordingly, the system 102 automatically provides a description of the attached document file(s) 168 and/or name of the tax form. The system 102 may store the descriptions associated with the attached document file(s) 168 in an attached document data table.

Figure 11:
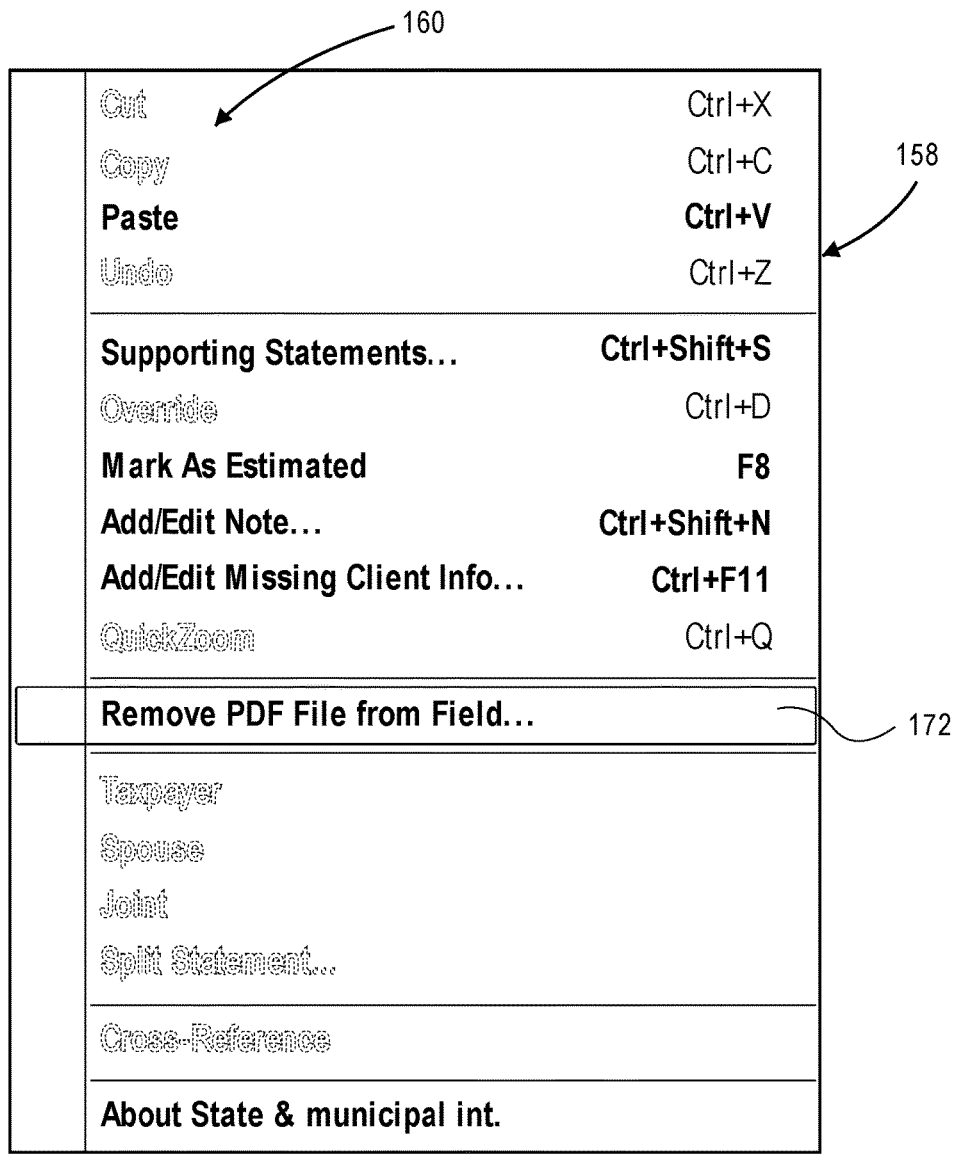
Figure 12:
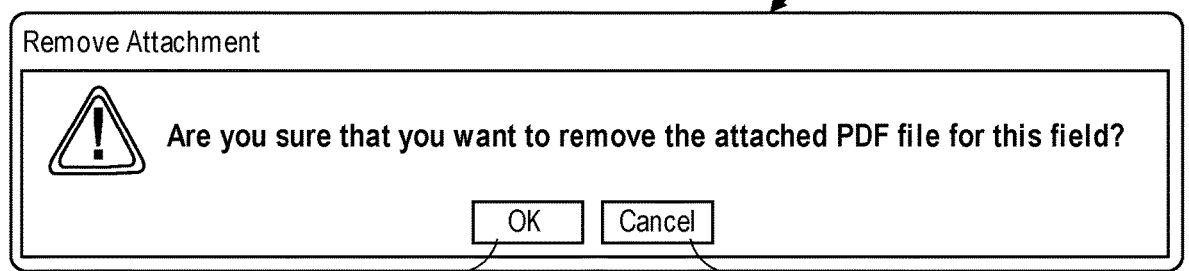

The tax preparation system 102 may also be configured such that the tax preparation software program 118 allows a user to remove a supporting document that was previously selected and associated with the selected form field 154. At step 334, the user selects a form field 154 which has a supporting document previously attached to it, such as using the process described above. The user can select the form field 154 by any suitable means, including the processes described above for attaching a supporting document. At step 336, the system receives the selection of the form field 154 which already has an associated supporting document file. At step 338, in response to receiving the selection of the form field already having an associated supporting document, the system 102 determines that the selected form field has a supporting document file associated therewith, and displays a selectable remove document command 172 (see FIG. 11) to the user for removing a supporting document related to the selected form field 154. As shown in FIG. 11, the remove document command 172 may be displayed in the same manner as the attach document command 162, as described herein. Indeed, the remove document command 172 may replace the attach document command 162 in the menu 160 of commands in the pop-up window 158 when a supporting document is already associated with the selected form field 154. At step 340, the user selects the remove document command 172 and the system 102 receives the selection of the remove document command 172 from the user. Upon receiving the remove document command 172, the system 102 may display a confirmation dialogue window 173 (see FIG. 12) to the user asking the user to confirm that the user wants to remove the supporting document file previously attached to the selected form field 154. If the user confirms (e.g., by selecting the "OK" command 175 in the confirmation dialogue window 173, see FIG. 12), at step 342, the system 102 modifies or deletes the data record previously generated to associate the attached supporting document file indicating that the document file is not associated with the selected form field. The system 102 then removes the document file from the tax return if it was previously attached to the tax return. If the user cancels the operation by selecting the "Cancel" command 177 (see FIG. 12) in the confirmation dialogue window 173, then the system 102 does not remove the attached supporting document.

The tax preparation system 102 may also be configured to provide a document management screen 174 (see FIG. 12) to the user. The document management screen 174 allows a user to review and/or modify the supporting documents (i.e., the document file(s) 168) attached to the tax return. At step 344, the document management screen 174 is activated by a user selecting the "Attach PDF Files" command 181 (see FIG. 5) in the main toolbar dropdown "E-File" menu. Upon a user selecting the command 181, at step 346, the system 102 displays a document management screen 174, as shown in FIG. 13. The document management screen 174 includes a list 176 of supporting document files attached to the tax return. The list 176 includes the description of each supporting document file (i.e., the description associated with the document file in 332) and the form field 154 to which the document file was attached. The system 102 may generate the list 176 using the attached document data table, described above. The screen 174 also has a selectable add attachment command 178, and a selectable remove attachment command 180. The document management screen 174 is configured to allow the user to select a document file from the list of document files and remove the selected document file from the tax return by selecting the remove attachment command 180. The screen 174 also allows the user to add a document file to the tax return by selecting the add attachment command 176.

The user may repeat the process and/or sub-process within steps 302-346 to select other form fields 154 of the tax form 152, or even form fields 154 of different tax forms 152 of the tax return being prepared, and attach and/or remove supporting documents, as shown by the loops in the flow chart of FIG. 3.

Once the tax data has been entered, at step 348 the tax preparation system 102 analyzes the tax data, performs tax calculations based on the tax rules and laws as programmed into the tax preparation application 118, and generates calculated tax data which is stored in the data store 118.

At step 350, the tax preparation system 102 processes and formats the tax data, calculated tax data, and attached supporting document file(s) into an electronic tax return data file according to the requirements and specifications (e.g., schema) of the pertinent tax agency to which the tax return is being filed. The system 102 automatically includes the document descriptions associated with the respective attached document files 168 in the electronic tax return data file.

At step 352, the electronic tax return data file is electronically filed with the appropriate tax agency. This may entail transmitting the electronic tax return data file directly to the tax authority or to an intermediary tax filing service provider which then transmits the electronic tax return data file to the tax authority. Alternatively, the tax return data file can used to create a paper forms submission in which the tax return forms and attached supporting documents are printed and then submitted to the appropriate tax authority.

It is understood that the process 300 may also be performed with the same system 102 utilizing interview screens instead of a simulated tax form having fillable input fields which the user can input tax data. In the case of interview screens, the process 300 only differs in that instead of a user selecting a particular form field, the system 102 displays an interview screen which requests tax data for a particular form field or a plurality of form fields of the tax return. In the case that the interview screen requests data for only a single form field of the tax return, then such form field is the selected form field. If the interview screen has multiple requests for tax data for a plurality of form fields, then the form field related to the request for tax data currently being worked on by the user is the selected form field. This may require an active selection by the user, similar to the selection of a form field 154 in a simulated tax form 152, or a default selection determined by the system 102 based on the current interview screen being displayed. The remainder of the process 300 for associating, attaching and removing a supporting document, and other functions, are the same for the interview screen implementation as for the simulated tax form implementation.

Accordingly, a system 100 is provided which can be used to prepare an electronic tax return in which supporting documents can be attached to the tax return with document descriptions automatically provided for each of the supporting documents. In additions, method embodiments implemented by the system 100 and/or its components for preparing an electronic tax return and attaching supporting documents thereto have also been provided.

The algorithms, processes, and method embodiments described herein, may also be embodied in, or readable from, a computer-readable medium (computer program carrier), e.g., one or more of the fixed and/or removable data storage data devices and/or data communications devices connected to a computer, including a non-transitory computer medium having instructions that when executed by a computer perform the described methods. The computer program carrier is readable by a computer and embodies instructions executable by the computer to perform the method steps of programming a computer to perform the methods implemented by the system 100 and/or its components, as described herein. Carriers may be, for example, magnetic storage medium, optical storage medium and magneto-optical storage medium. Examples of carriers include, but are not limited to, a floppy diskette, a memory stick or a flash drive, a hard drive, CD-R, CD-RW, CD-ROM, DVD-R, and DVD-RW.

Although particular embodiments have been shown and described, it is to be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while multiple embodiments and variations of the many aspects of the invention have been disclosed and described herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially.

Accordingly, embodiments are intended to exemplify alternatives, modifications, and equivalents that may fall within the scope of the claims.

What is claimed is:

1. A system for preparing an electronic tax return for a taxpayer, comprising:
   a tax preparation system including a computer having a computer processor, memory, a storage device for reading and writing tax data to the storage device, and a tax preparation software program; and
   the tax preparation software program configured to program the computer to perform a process for preparing an electronic tax return for a taxpayer, comprising:
   displaying a tax data input screen to a user requesting tax data, regarding the taxpayer, for a first form field of a tax return;
   inputting a selection of the first form field by the user:
   in response to the selection of the first form field, determining that the first form field requires a document to be attached to the electronic tax return, by using pre-defined metadata associated with the first form field, that indicates whether a supporting document is allowed or required, wherein the pre-defined metadata is stored in a same metadata record as descriptive metadata, or in a separate metadata record;
   displaying a selectable attach document command to the user for attaching a supporting document related to the first form field;
   receiving a selection of the attach document command from the user; displaying a file selection function to the user which allows the user to select a document file to be associated with the first form field;
   receiving a selection of a document file from the user;
   generating a data record that associates the selected document file with the first form field;
   determining a pre-defined document description for the selected document file from the metadata associated with the first form field;
   automatically providing the document description for the selected document file to the data record;
   attaching the selected document file to the tax return;
   inputting a document management screen activation selection from the user;
   displaying a document management screen to the user in response to receiving the document management screen activation selection, the document management screen including a list of document files attached to the tax return, a selectable add attachment command, and a selectable remove attachment command, the document management screen configured to allow the user to select a document file from the list of document files and remove the selected document file from the tax return by selecting the remove attachment command and to allow the user to add a document file to the tax return by selecting the add attachment command; and generating an electronic tax return data file for submission to a tax agency, the tax return data file comprising contents of the electronic tax return, the selected document file and the document description of the selected document.

2. The system of claim 1, wherein the tax data input screen comprises a plurality of form fields of the tax return having respective data input fields for entering tax data for the respective form field, and the process further comprises receiving the selection of the first form field from the user from among the plurality of form fields.

3. The system of claim 2, wherein receiving the selection of the first form field comprises receiving a user input device click command on the first form field from the user.

4. The system of claim 1, wherein the tax data input screen comprises an interview screen requesting tax data regarding the taxpayer for the first form field.

5. The system of claim 4, wherein the file selection function is displayed to the user while the interview screen is being displayed.

6. The system of claim 1, wherein the attach document command is displayed in a pop-up window having a menu of a plurality of commands, and the file selection function is displayed in a pop-up window.

7. The system of claim 1, wherein the process further comprises:
    displaying a selectable remove document command to the user for removing a supporting document related to the first form field;
    receiving a selection of the remove document command from the user;
    modifying or deleting the data record to indicate that the document file is not associated with the first form field; and
    removing the document file from the tax return.

8. A system for preparing an electronic tax return, comprising:
    a tax preparation system including a computer having a computer processor, memory, a storage device for reading and writing tax data to the storage device, and a tax preparation software program; and
    the tax preparation software program configured to program the computer to perform a process comprising:
    displaying a tax data input screen comprising a plurality of form fields of a tax return having respective data input fields for entering tax data for the plurality of form fields;
    receiving a selection of a first form field from a user from among the plurality of form fields;
    in response to the selection of the first form field, determining that the first form field requires a document to be attached to the electronic tax return, by using pre-defined metadata associated with the first form field, that indicates whether a supporting document is allowed or required, wherein the pre-defined metadata is stored in a same metadata record as descriptive metadata, or in a separate metadata record;
    displaying a pop-up window having an attach document command to attach and associate a document file to the form field;
    receiving a selection of the attach document command from the user; displaying a file selection window which allows the user to select a document file to be associated with the form field;
    receiving a selection of a document file from the user;
    generating a data record that associates the selected document file with the first form field;
    determining a pre-defined document description for the selected document file from the metadata associated with the first form field;
    automatically providing the document description for the selected document file to the data record;
    attaching the selected document file to the tax return;
    inputting a document management screen activation selection from the user;
    displaying a document management screen in response to receiving the document management screen activation selection, the document management screen including a list of document files attached to the tax return, a selectable add attachment command, and a selectable remove attachment command, the document management screen configured to allow the user to select a document file from the list of document files and remove the selected document file from the tax return by selecting the remove attachment command and to allow the user to add a document file to the tax return by selecting the add attachment command; and
    generating an electronic tax return data file for submission to a tax agency, the tax return data file comprising contents of the electronic tax return, the selected document file and the document description of the selected document.

9. The system of claim 8, wherein the process further comprises:
    receiving a second selection of the first form field from the user;
    displaying a pop-up window having a selectable remove document command to remove a document file previously associated with the first form field;
    receiving a selection of the remove document command from the user;
    modifying or deleting the data record to indicate that the document file is not associated with the first form field; and
    removing the document file from the tax return.

10. The system of claim 8, wherein the process further comprises:
    determining whether the selected document file is already attached to the tax return for a different form field than the first form field;
    when the selected document file is already attached to the tax return for a different form field, displaying a message to the user that the selected document file is already attached to the tax return;
    when the selected document file is not already attached to the tax return for a different form field, attaching the selected document file to the tax return.

11. The system of claim 8, wherein the tax preparation system comprises a website server system configured to enable a website for the user using a user computing device to utilize the tax preparation system via the internet to prepare a tax return, and the tax preparation system displays information to the user by transmitting data to a user computing device via the internet.

12. The system of claim 11, wherein the step of attaching the selected document file to the tax return comprises uploading the document file from the user computing device to the website server system via the internet.

13. The system of claim 8, wherein the process further comprises:
    displaying a selectable attach document enable command to the user;

receiving a selection of the attach document enable command from the user; and enabling the attach document command to be selectable by the user.

14. The system of claim 8, wherein the process further comprises:

displaying a selectable attach document disable command to the user;

receiving a selection of the attach document disable command from the user; and disabling the attach document command such that it is not selectable by the user.

15. A computer-implemented method of preparing an electronic tax return, comprising:

displaying a tax data input screen to a user requesting tax data, regarding the taxpayer, for a first form field of a tax return;

inputting a selection of the first form field by the user:

in response to the selection of the first form field, determining that the first form field requires a document to be attached to the electronic tax return, by using pre-defined metadata associated with the first form field, that indicates whether a supporting document is allowed or required, wherein the pre-defined metadata is stored in a same metadata record as descriptive metadata, or in a separate metadata record;

displaying a selectable attach document command to the user for attaching a supporting document related to the first form field;

receiving a selection of the attach document command from the user;

displaying a file selection function to the user which allows the user to select a document file to be associated with the first form field;

receiving a selection of a document file from the user;

generating an electronic data record that associates the selected document file with the first form field;

determining a pre-defined document description for the selected document file from the metadata associated with the first form field;

automatically providing the document description for the selected document file to the data record;

attaching the selected document file to the tax return;

inputting a document management screen activation selection from the user;

displaying a document management screen to the user in response to receiving the document management screen activation selection, the document management screen including a list of document files attached to the tax return, a selectable add attachment command, and a selectable remove attachment command, the document management screen configured to allow the user to select a document file from the list of document files and remove the selected document file from the tax return by selecting the remove attachment command and to allow the user to add a document file to the tax return by selecting the add attachment command; and generating an electronic tax return data file for submission to a tax agency, the tax return data file comprising contents of the electronic tax return, the selected document file and the document description of the selected document.

16. The method of claim 15, wherein the tax data input screen comprises a plurality of form fields of the tax return having respective data input fields for entering tax data for the respective form field, and the method further comprises: receiving the selection of the first form field from the user from among the plurality of form fields.

17. The method of claim 16, wherein receiving the selection of the first form field comprises receiving a user input device click command on the first form field from the user.

18. The method of claim 15, wherein the tax data input screen comprises an interview screen requesting tax data regarding the taxpayer for the first form field.

19. The method of claim 18, wherein the file selection function is displayed to the user while the interview screen is being displayed.

20. The method of claim 15, wherein the attach document command is displayed in a pop-up window having a menu of a plurality of commands, and the file selection function is displayed in a pop-up window.

21. The method of claim 15, further comprising:

displaying a selectable remove document command to the user for removing a supporting document related to the first form field;

receiving a selection of the remove document command from the user;

modifying or deleting the data record to indicate that the document file is not associated with the first form field; and removing the document file from the tax return.

22. A method of preparing an electronic tax return, comprising:

displaying a tax data input screen comprising a plurality of form fields of a tax return having respective data input fields for entering tax data for the plurality of form fields;

receiving a selection of a first form field from a user from among the plurality of form fields;

in response to the selection of the first form field, determining that the first form field requires a document to be attached to the electronic tax return, by using pre-defined metadata associated with the first form field, that indicates whether a supporting document is allowed or required, wherein the pre-defined metadata is stored in a same metadata record as descriptive metadata, or in a separate metadata record;

displaying a pop-up window having an attach document command to attach and associate a document file to the form field;

receiving a selection of the attach document command from the user; displaying a file selection window which allows the user to select a document file to be associated with the form field;

receiving a selection of a document file from the user;

generating a data record that associates the selected document file with the first form field;

determining, from the metadata associated with the first form field, a pre-defined document description for the selected document file;

automatically providing document description for the selected document file to the data record;

attaching the selected document file to the tax return;

inputting a document management screen activation selection from the user;

displaying a document management screen in response to receiving the document management screen activation selection, the document management screen including a list of document files attached to the tax return, a selectable add attachment command, and a selectable remove attachment command, the document management screen configured to allow the user to select a document file from the list of document files and remove the selected document file from the tax return by selecting the remove attachment command and to allow the user to add a document file to the tax return by selecting the add attachment command; and generating an electronic tax return data file for submission to a tax agency, the tax return data file comprising contents of the electronic tax return, the selected document file and the document description of the selected document.

23. The method of claim 22, further comprising:
receiving a second selection of the first form field from the user;
displaying a pop-up window having a selectable remove document command to remove a document file previously associated with the first form field;
receiving a selection of the remove document command from the user;
modifying or deleting the data record to indicate that the document file is not associated with the first form field; and
removing the document file from the tax return.

24. The method of claim 22, further comprising:
determining whether the selected document file is already attached to the tax return for a different form field than the first form field;
when the selected document file is already attached to the tax return for a different form field, displaying a message to the user that the selected document file is already attached to the tax return;
when the selected document file is not already attached to the tax return for a different form field, attaching the selected document file to the tax return.

25. The method of claim 22, wherein the method is performed by tax preparation system comprising a website server system configured to enable a website for the user using a user computing device to utilize the tax preparation system via the internet to prepare a tax return, and the tax preparation system displays information to the user by transmitting data to a user computing device via the internet.

26. The method of claim 25, wherein the step of attaching the selected document file to the tax return comprises uploading the document file from the user computing device to the website server system via the internet.

27. The method of claim 22, further comprising:
displaying a selectable attach document enable command to the user;
receiving a selection of the attach document enable command from the user; and
enabling the attach document command to be selectable by the user.

28. The method of claim 22, further comprising:
displaying a selectable attach document disable command to the user;
receiving a selection of the attach document disable command from the user; and
disabling the attach document command such that it is not selectable by the user.

29. An article of manufacture comprising a non-transitory computer program carrier readable by a computer and embodying instructions executable by the computer to perform a method for preparing an electronic tax return for a taxpayer, the method comprising:
displaying a tax data input screen to a user requesting tax data, regarding the taxpayer, for a first form field of a tax return;
inputting a selection of the first form field by the user;
in response to the selection of the first form field, determining that the first form field requires a document to be attached to the electronic tax return, by using pre-defined metadata associated with the first form field, that indicates whether a supporting document is allowed or required, wherein the pre-defined metadata is stored in a same metadata record as descriptive metadata, or in a separate metadata record;
displaying a selectable attach document command to the user for attaching a supporting document related to the first form field;
receiving a selection of the attach document command from the user;
displaying a file selection function to the user which allows the user to select a document file to be associated with the first form field;
receiving a selection of a document file from the user;
generating an electronic data record that associates the selected document file with the first form field;
determining a pre-defined document description for the selected document file from the metadata associated with the first form field;
automatically providing the document description for the selected document file to the data record;
attaching the selected document file to the tax return;
inputting a document management screen activation selection from the user;
displaying a document management screen to the user in response to receiving the document management screen activation selection, the document management screen including a list of document files attached to the tax return, a selectable add attachment command, and a selectable remove attachment command, the document management screen configured to allow the user to select a document file from the list of document files and remove the selected document file from the tax return by selecting the remove attachment command and to allow the user to add a document file to the tax return by selecting the add attachment command; and
generating an electronic tax return data file for submission to a tax agency, the tax return data file comprising contents of the electronic tax return, the selected document file and the document description of the selected document.

30. An article of manufacture comprising a non-transitory computer program carrier readable by a computer and embodying instructions executable by the computer to perform a method for preparing an electronic tax return for a taxpayer, the method comprising:
displaying a tax data input screen comprising a plurality of form fields of a tax return having respective data input fields for entering tax data for the plurality of form fields;
receiving a selection of a first form field from a user from among the plurality of form fields;
in response to the selection of the first form field, determining that the first form field requires a document to be attached to the electronic tax return, by using pre-defined metadata associated with the first form field, that indicates whether a supporting document is allowed or required, wherein the pre-defined metadata is stored in a same metadata record as descriptive metadata, or in a separate metadata record;
displaying a pop-up window having an attach document command to attach and associate a document file to the form field;

receiving a selection of the attach document command from the user;

displaying a file selection window which allows the user to select a document file to be associated with the form field;

receiving a selection of a document file from the user;

generating a data record that associates the selected document file with the first form field;

determining a pre-defined document description for the selected document file from the metadata associated with the first form field;

automatically providing the document description for the selected document file to the data record;

attaching the selected document file to the tax return;

inputting a document management screen activation selection from the user;

displaying a document management screen in response to receiving the document management screen activation selection, the document management screen including a list of document files attached to the tax return, a selectable add attachment command, and a selectable remove attachment command, the document management screen configured to allow the user to select a document file from the list of document files and remove the selected document file from the tax return by selecting the remove attachment command and to allow the user to add a document file to the tax return by selecting the add attachment command; and generating an electronic tax return data file for submission to a tax agency, the tax return data file comprising contents of the electronic tax return, the selected document file and the document description of the selected document.

* * * * *